United States Patent [19]
Kloeppel et al.

[11] Patent Number: 6,149,159
[45] Date of Patent: Nov. 21, 2000

[54] HIGH PRESSURE BOUNDARY SEAL

[75] Inventors: Klaus D. Kloeppel, Watsonville; Robert M. Pelstring, Santa Cruz, both of Calif.

[73] Assignee: Seagate Technology LLC, Scotts Valley, Calif.

[21] Appl. No.: 09/107,803

[22] Filed: Jun. 30, 1998

[51] Int. Cl.$^7$ ........................................................ F16J 15/54
[52] U.S. Cl. ............................................. 277/399; 277/411
[58] Field of Search ........................................ 277/399, 411, 277/424, 431, 447, 457, 459, 465, 506, 549, 552

[56] References Cited

U.S. PATENT DOCUMENTS

| | | |
|---|---|---|
| 5,347,189 | 9/1994 | Chuta et al. . |
| 5,662,462 | 9/1997 | Paley et al. . |
| 5,925,955 | 9/1999 | Norris . |

*Primary Examiner*—Anthony Knight
*Assistant Examiner*—Karlena D Schwing
*Attorney, Agent, or Firm*—Flehr Hohbach Test Albritton & Herbert

[57] ABSTRACT

A high pressure boundary seal adjacent at least one of the bearings of the spindle motor. The motor itself includes a shaft, typically a fixed shaft and a rotor supported by bearings and rotating outside the shaft. The high-pressure boundary seal comprises a ring which surrounds the shaft across a small gap and is supported from and rotates with the rotor or hub. In a first embodiment, a herringbone pattern is defined on the inner surface of the ring or the outer surface of the shaft. The upper and lower sections of the herringbone pattern are substantially equal so that a zone of high pressure is established at about the center of the pattern. This high pressure boundary zone prevents the flow of any contaminants from the interior of the motor or the bearing between the shaft and the sealing ring out into the interior section of the disc drive housing where they could potentially contaminate the disc.

15 Claims, 5 Drawing Sheets

HIGH PRESSURE BOUNDARY SEAL

FIELD OF THE INVENTION

This invention relates to magnetic disc drives, and particularly to an improved spindle motor design for use in a disc drive incorporating an improved seal to prevent contaminants generated inside of the motor from entering the remaining disc drive interior. U.S. Pat. No. 5,617,272 is incorporated herein by reference.

BACKGROUND OF THE INVENTION

Disc drive units in general are known in the art for use in modern microcomputers such as personal and desk top computers. In the most common form, such disc drive units comprise a so-called Winchester disc drive having one more rotatable memory storage discs mounted within a substantially sealed disc drive housing along with one or more related electromagnetic heads for reading and writing data on appropriately prepared disc surfaces. A disc drive of this type is sometimes referred to as a hard or a fixed disc drive and is normally available as a compact, complete package with the sealed housing on a rigid chassis or frame together with a circuit board carrying the necessary drive electronics.

Within the sealed disc drive, a rotating constant speed spindle motor is provided for mounting and rotating the discs. Because of the extremely fine tolerances in the internal components to the disc drive especially the head and the disc surface, the head disc assembly is sealed against the outside air to prevent the entry of contaminants. In order to minimize the size of the disc drive, modern spindle motors are designed with many components inside the hub which supports the discs. Therefore, it is also critical to provide a seal between the spindle motor which mounts the discs for rotation and the interior of the head disc assembly. Magnetic fluid seals are already widely used in spindle motors for disc drives as a means to seal portions of the regions within the head disc assembly to prevent the flow of air through the motor bearings or motor internal components, thus preventing particles such as grease aerosols from circulating from the motor into the interior of the head disc assembly.

It is standard practice in the disc drive industry in using magnetic fluid seals to use an adhesive to retain the seal in its defined location, and to prevent air flow around the outside diameter of the seal. A typical example of such a device shown in the simplest form appears in FIG. 1A and includes a housing 1 and shaft 3. A pair of annular pole pieces 13 and 15 are provided, sandwiching a permanent magnet 11 which is integrally inserted there between to form the ferro-fluidic seal of the device. The ferro-fluid 9 is disposed between the pole pieces 13 and 15 and the shaft 3. The magnet 11 causes the ferro-fluid to be retained in place between the pole-pieces 13 and 15 and the shaft 3 so that a seal is formed through which contaminants can not pass. As shown in this example, which is taken from U.S. Pat. No. 5,161,902 in order to prevent contaminants from passing through the outer radial gap b between the housing 1 and the pole pieces 13, 15, the gap between at least one of the pole pieces and the housing is filled with an adhesive bonding agent 23.

However, not only are ferro-fluid seals costly, but also are sensitive to packaging and shipping problems. Mishandling or sharp shocks to the disc drive or motor could lead to a splashed or burst seal, where the ferro-fluid migrates to the disc surfaces, leading to malfunction of the disc drive. A sharp pressure change could also lead to loss of fluid. Further, the use of adhesive could itself lead to contamination of the disc area.

Therefore, an alternative design which eliminates the need for the magnetic seal at the top of the shaft would be highly desirable. At the bottom of the shaft, adjacent the lower bearing, a clearance seal is typically provided, however, such a seal if utilized at the top of the shaft would require additional shaft length which is typically not available in a disc drive such as where these motor designs are commonly used.

SUMMARY OF THE INVENTION

The objective of the invention is to provide a sealing structure useful to prevent the escape of particles from the shaft/bearing structure of a spindle motor into the outside atmosphere surrounding the motor.

A related objective of the invention is to provide a seal structure useful adjacent the bearing of a motor which is easy to assemble and does not add significant cost to the motor.

A related objective is to provide for ease of assembly of a two-bearing motor or shaft/hub cartridge incorporating a shaft, upper and lower bearings and outer rotor with the shaft and rotor being relatively rotatable; the motor should able to be easily and readily assembled and installed in a disc drive, providing for time efficient assembly at a minimum cost in parts and labor.

Yet another objective of the invention is to provide for a sealing means adjacent the bearing of a spindle motor which retains contaminants within the motor effectively without the use of fluids and/or adhesives which could themselves lead to contamination of the supported discs.

These and other objectives of the present invention are achieved by providing a high pressure boundary seal adjacent at least one of the bearings of the spindle motor. The motor itself includes a shaft, typically a fixed shaft and a rotor supported by bearings and rotating outside the shaft. The high-pressure boundary seal replaces the magnetic seal which has been used in the prior art, and comprises a ring, which typically is incorporated in a seat or the like, which surrounds the shaft and is supported from and rotates with the rotor or hub. The ring is spaced across a small gap from the shaft. In a first embodiment, a herringbone pattern is defined on the inner surface of the ring or the outer surface of the shaft. The upper and lower sections of the herringbone pattern are substantially equal so that a zone of high pressure is established at about the center of the pattern. This high pressure boundary zone prevents the flow of any contaminants from the interior of the motor out into the interior section of the disc drive housing where they could potentially contaminate the disc. The sealing ring is pressure fit inside a shoulder of the rotor or hub so that in a preferred environment, no adhesives need to be used for mounting.

In an alternative embodiment, a pattern comprising a plurality of scallops is defined in the upper and lower edges of the sealing ring facing the shaft. These grooves or scallops are shaped so they pump air toward the center line of the sealing ring. The fissures for the scallops are sized to establish an air flow or pumping pressure which is substantially equal from the top and the bottom side of the ring toward the center of the ring, again preventing any flow contaminants. Better understood by reference to the following figures and the detail description of the invention, given in conjunction with those figures.

DETAILED DESCRIPTION OF A PREFERRED EMBODIMENT

Figure 1A:
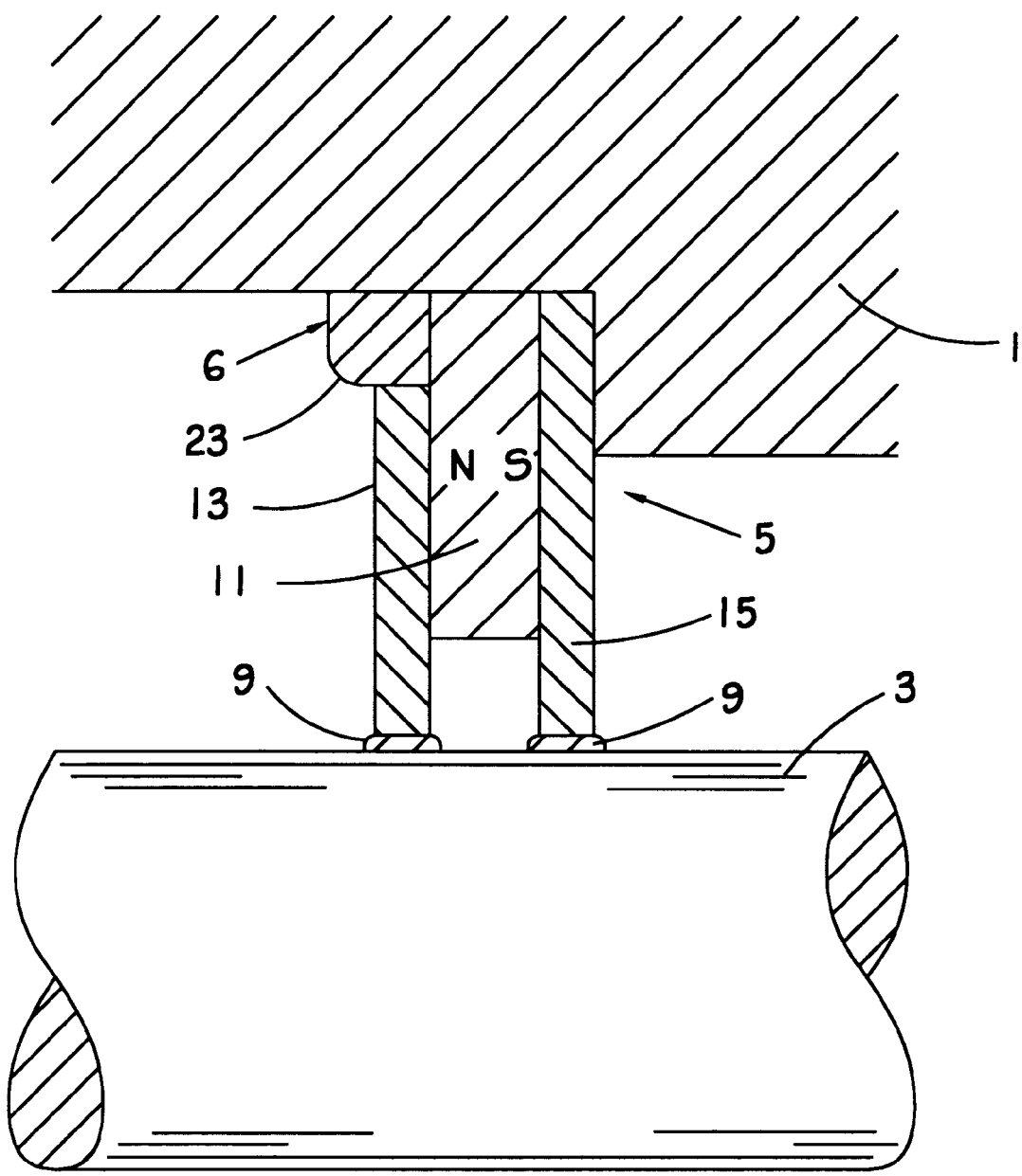
FIG. 1A is a sectional view of a prior art shaft seal.
Figure 1B:
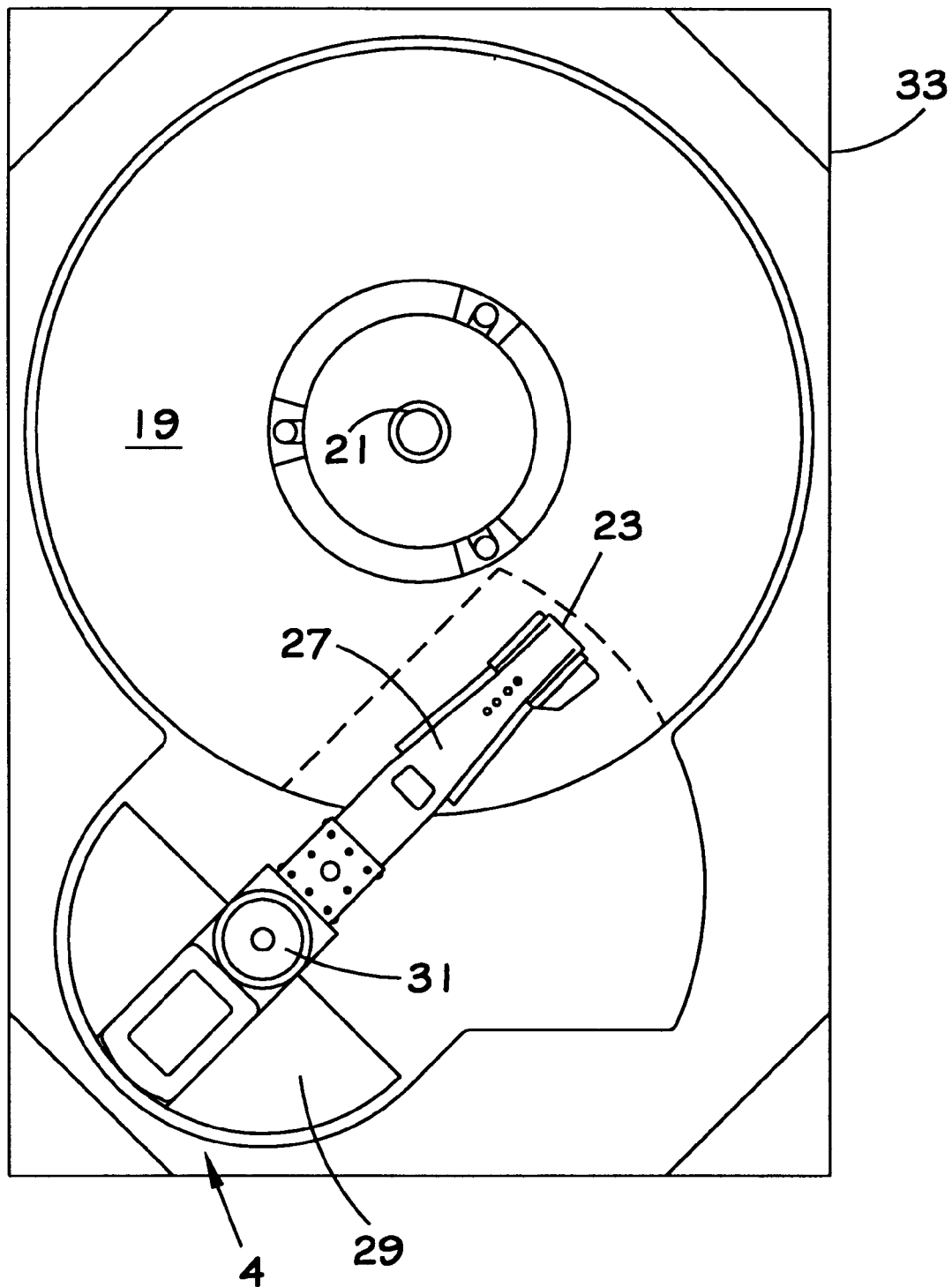
FIG. 1B is a plan view of a disc drive in which the present invention is useful.

As stated above, this design for an advanced high pressure boundary seal for use adjacent to one or more of the bearings of a spindle motor is especially used in a disc drive of the type shown in FIG. 1B. FIG. 1B is a plan view of a typical disc drive incorporating a spindle motor whose spindle 21 mounts one or more discs 19 for rotation at constant speed. A transducer 23 is supported on an actuator arm 27 to be selectively positioned over any one of the recording tracks on the surface of the disc in response to commands to the voice coil motor 29 which is at the opposite end of the actuator arm from the transducer 23 and causes pivoting of the arm 27 over the disc surface. It is apparent from a review of this figure that the spindle motor must be capable of constant high speed rotation for thousands of hours.

It is further apparent that if any particles or contaminants are generated inside the motor that they must be contained so that they can not escape into the sealed interior housing of the disc drive where they can land on and contaminate the surface of the disc. Such contamination could render regions of the disc inaccessible; and ultimately, the disc could be relatively useless.

Figure 2:
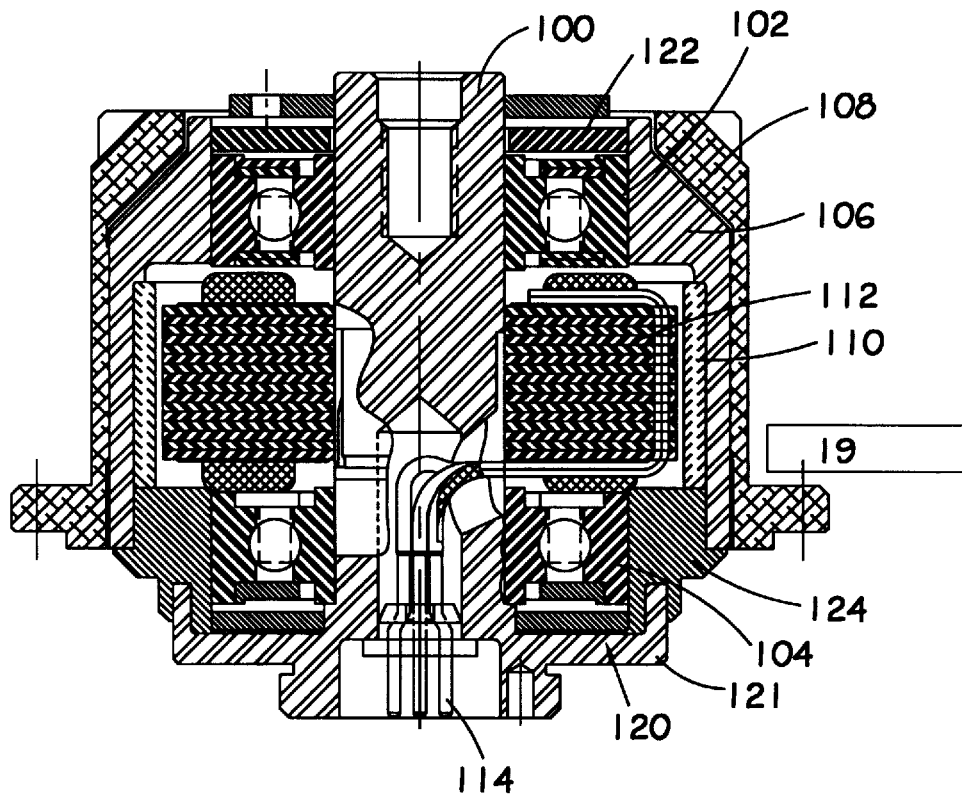
FIG. 2 is a vertical section view of a spindle motor designed for use in a disc drive incorporating a magnetic seal of a type found in the prior art.

FIG. 2 is a vertical section of a motor in which the high pressure seal of the present invention is useful. Certainly, the seal is used in many other kinds of motors; this motor is illustrated simply to show the general physical relationship of the parts and the relative location of the bearing and the adjacent new high pressure boundary seal. Specifically, FIG. 2 shows a motor adapted to be a spindle motor with a shaft 100 and upper and lower bearings 102, 104 supporting a rotor piece 106 which serves as a back iron, and a disc support hub 108 which supports one or more discs 19 for rotation. The back iron 106 supports a magnet 110 adjacent a stator 112; energization of this stator through the leads generally indicated at 114 establishes a field which interacts with the magnet 110 and causes rotation of the rotor. As can be seen from this figure, to prevent the escape of any particles or contaminants generated within the motor, the lower bearing is isolated from the sealed hard disc region by a labyrinth seal indicated generally at 120 defined between base casting 121 and bearing holder 124. At the axially upper end of the shaft 100, a lack of space prevents the use of a labyrinth seal. Therefore, it is well known in this field to use a magnetic seal generally indicated at 122 and shown in greater detail in FIG. 3.

Figure 3:
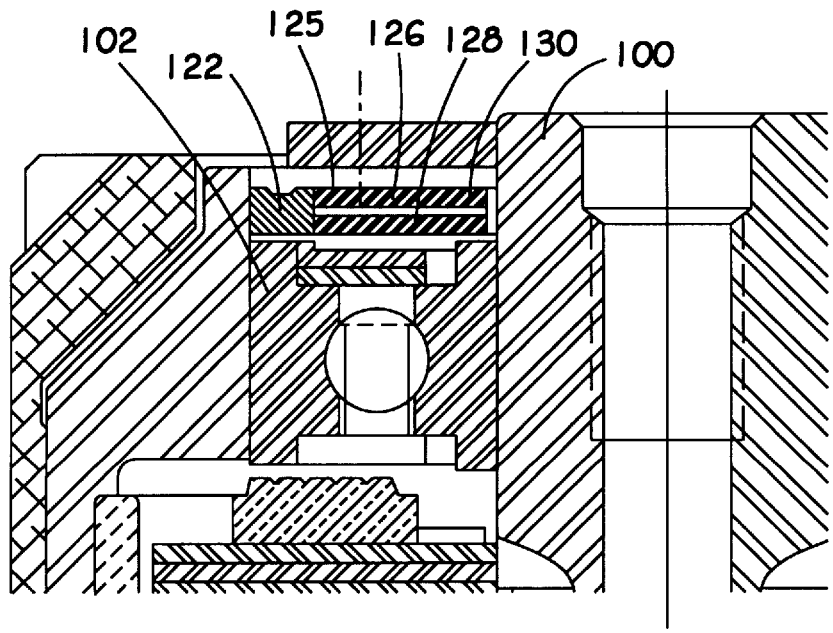
FIG. 3 is an enlarged view of the upper bearing and magnetic seal used in the motor of FIG. 2.

As appears in FIG. 3, the upper bearing 102 has a magnetic seal 122 adjacent thereto which as is well know in this technology, typically includes first and second plates 125, 126 with a pole piece 128 to aid in concentrating the magnetic field 128. To allow for relative rotation of the plates relative to the shaft 100, a magnetic fluid 130 fills the space between the ends of the plates 124, 128 and the surface of the shaft 100.

However, as noted above in the introduction to this disclosure, difficulties have been detected in the use of such seals, including fluid splash or bursting problems because of sudden pressure changes, handling difficulties, vacuum sealing problems, transportation and the like.

Therefore, a search has been made for an alternative solution to seal particles, bearing grease, and aerosols within the motor as they are generated during use of the motor. As will be demonstrated in detail below, the present designs shown in detail in FIGS. 4A through 4E utilize pumping grooves or slits and the pressure profiles associated with the spinning of parts relative to one another to establish a means for effectively sealing such particles and aerosols within the motor. Further, it is believed that this approach will provide a cost effective and reliability solution which is equal to or superior to the use of the magnetic seal.

Figure 4B:
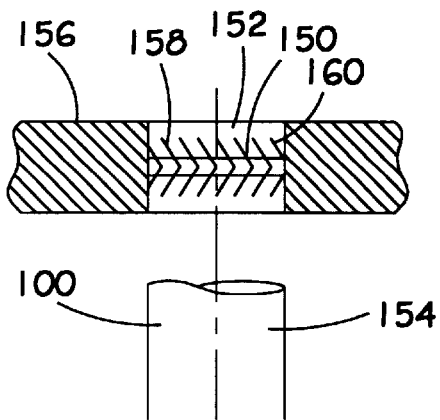
FIGS. 4B and 4C are detailed views of the shaft and bearing seal ring which are emphasized in the detail view of FIG. 4A.
Figure 4C:
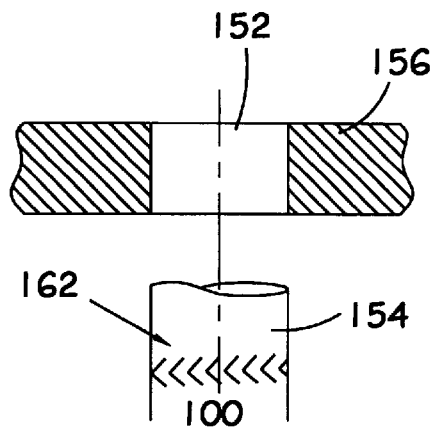
Figure 4A:
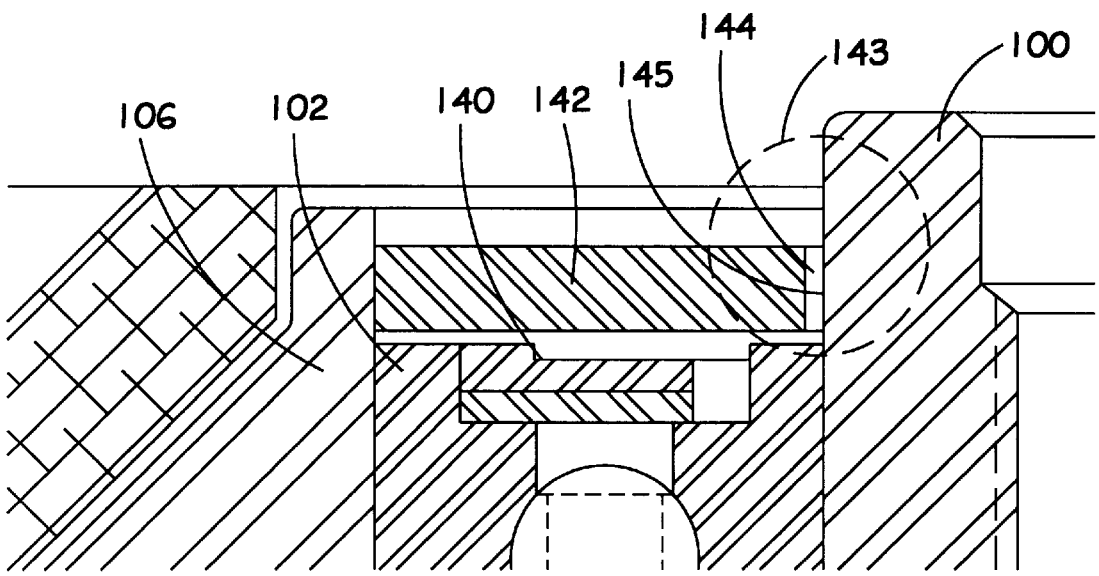
FIG. 4A is a view of substantially the same motor portion as shown in FIG. 3 with the magnetic seal replaced by the high pressure seal of the present invention.

Referring to FIG. 4A, the figure shows the same upper ball bearing 102 which appears in the previous figures, with one end covered by a bearing cover 140. However, the magnetic seal of FIGS. 2 and 3 is replaced by the high pressure boundary seal system 143 of the present invention which comprises a seal ring 142 which is separated by a gap 144 from the shaft 100. The seal ring is preferably supported from the rotor or hub 106 by being press fit or alternatively but less desirably glued in place against the inner wall of this rotor piece. The inner axial surface 145 of the sealing ring 142 is separated from the shaft 100 by a gap 144 of 0.025 mm to 0.05 mm; this gap, since it is defined by a single part rather than an assembly of parts as with a magnetic simplifies the seal installation. The seal ring inner surface 145 and/or the outer surface of the shaft 100 will carry a pattern which establishes a high pressure boundary zone in the gap 144 between the seal ring and the shaft or immediately adjacent thereto so that contaminants, grease and the like cannot escape from the inner regions of the motor. For example, referring to FIG. 4B, a herringbone pattern 150 may be etched around the inner circular surface 152 of the sealing ring which faces the outer surface 154 of the shaft 100. The upper and lower segments 156, 158 of each chevron of the herringbone pattern should be substantially equal so that the result is a substantially equal pumping pressure from both the upper and lower sides of the sealing ring toward the center of the ring, establishing a pressure boundary region 160 in the gap near the center of the ring.

An alternative approach is shown in FIG. 4C where the inner surface 152 of the sealing ring 142 is smooth and the herringbone pattern generally indicated at 162 is defined on the outer surface 154 of the shaft 100. The effect in establishing the pressure boundary region 160 in the gap at approximately the center of the herringbone pattern should be equally well achieved. In most instances, forming this pattern on the outer surface of the shaft may be more difficult or expensive than forming it on the inner surface of the sealing ring 142, but other construction fabrication or assembly issues may dictate the adoption of this alternative.

Figure 4D:
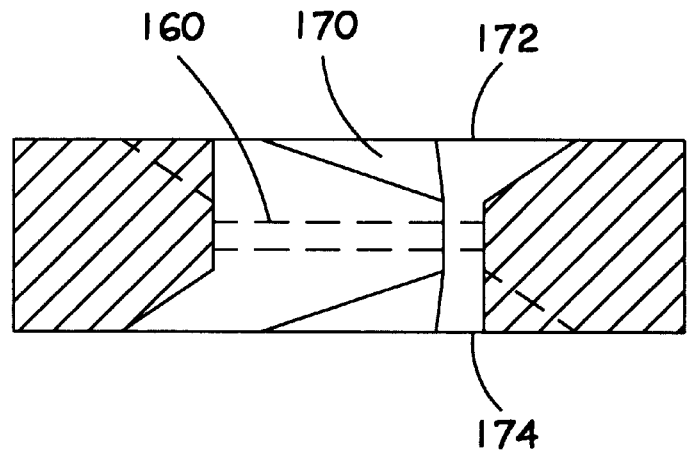
FIGS. 4D and 4E are a sectional view and a partial perspective view respectively of further alternative embodiments of the seal ring used to form the high pressure boundary seal of the invention.
Figure 4E:
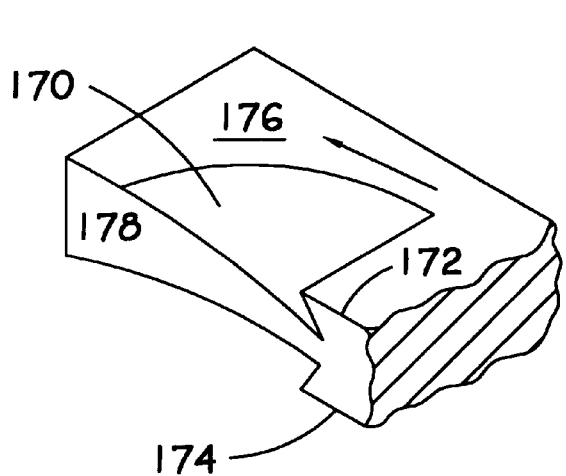

Further alternatives are shown here in FIGS. 4D and 4E, which it is believed would result in enhanced pumping toward the high pressures zone 160 which is to be developed toward the center of the seal ring. As shown first in FIG. 4D as well as in FIG. 4E, a tapered chevron-like shape 170 is formed at each of the upper and lower edges 172, 174 of the sealing ring. The chevron like shape is adopted as most clearly appears in FIG. 4E so that the cutout is taken from both the top, radially facing surface 176 and the inner axially extending surface 178 of the sealing ring. A plurality of these chevron like depressions would need to be spaced around the sealing ring in order to create the proper boundary pressure with the cuts into the upper and lower edges 172, 174 being substantially symmetrically located so that an equal boundary pressure would be established.

Figure 4F:
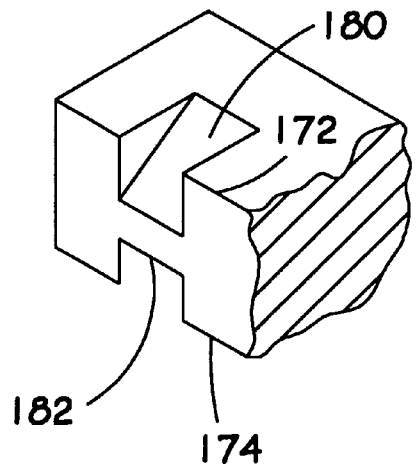

A further alternative is shown in FIG. 4F where a substantially triangular depression 180, 182 is formed at each of the upper and lower edges, 172, 174 of the sealing ring. Once again, these depressions or cut outs would need to be symmetrically located with a plurality distributed over the upper and lower edges of the sealing ring.

In summary, it is submitted that the use of the high pressure boundary sealing system comprising a sealing ring with appropriate pressure forming pattern, whether it be a herringbone pattern or depression or other defined shape to aggressively pump from both the upper and lower sides of the ring to establish the pressure boundary zones near the center of the ring provides a highly effective seal at a lower cost than the know ferro-fluidic seals. It is believed that the seal as shown will be highly effective in preventing particles from leaving the inside of the motor during spinning operation. Further, the gaps between the parts are such as can be easily handled according to the current state of the art in motor construction and assembly.

As an alternative, the sealing ring patterns could be modified to create a net pumping pressure toward the lower portion of the ring. However, this alterative could easily result in pumping contaminants out through the lower end of the motor if that lower end is protected only by a labyrinth seal or similar passive seal. Therefore, this alternative should probably only be needed if a counter-balancing pumping pressure is established at the other end of the shaft; or, in a further alternative, some trap for the contaminants is established in the system.

Other feature advantages of the present invention will become apparent to a person of skill in this field who studies the disclosure. Therefore, the scope of the invention is to be limited only by the following claims.

What is claimed is:

1. A high pressure boundary seal in combination with a spindle motor comprising a shaft and a rotor rotating around the shaft and supporting a hub for supporting one or more discs for rotation around such shaft, bearing means comprising upper and lower bearings for supporting said rotor for rotation around said shaft, and a high pressure boundary seal adjacent one of said upper and lower bearings comprising a sealing ring having an inner, axial surface spaced by a relatively small gap from an outer surface of said shaft, and one of said ring and said shaft having a pattern thereon for creating an air pressure boundary sealing region in the gap between said surfaces of said shaft and said sealing ring to prevent particles, contaminants or aerosols within said motor from escaping past said seal.

2. A high pressure seal is claimed in claim 1 wherein said pattern comprises a substantially herringbone shaped pattern on said axial surface of said sealing ring.

3. A high pressure boundary seal is claimed in claim 2 wherein said herringbone comprises upper and lower grooves of substantially equal length.

4. A high pressure seal as claimed in claim 2 wherein the boundary seal is immediately adjacent the upper bearing and near to a distal end of the shaft.

5. A high pressure seal as claimed in claim 1 wherein said pattern is formed on said sealing ring at or near the axial center of said sealing ring.

6. A high pressure boundary seal as claimed in claim 1 wherein a herringbone pattern is formed on said shaft facing said sealing ring, said sealing ring having a smooth axial surface.

7. A high pressure boundary seal as claimed in claim 6 wherein said gap is about 0.025 mm.

8. A high pressure boundary seal as claimed in claim 1 wherein said sealing ring has upper and lower edges, and said pattern comprises a series of fissures formed in said upper and lower edges of said sealing ring and extending into the upper and lower surfaces of said sealing ring, as well as into said axial surface of said sealing ring, so that said fissures provide a balanced, high-pressure boundary sealing region.

9. A high pressure boundary seal as claimed in claim 8 wherein said fissures are regularly spaced around said upper and lower edges of said sealing ring.

10. A high pressure boundary seal as claimed in claim 1 wherein said fissures are regularly spaced around said upper and lower edges of said sealing ring.

11. A high pressure boundary seal as claimed in claim 1 wherein said pattern comprises a series of substantially rectangular notches formed in the upper and lower edges of said sealing ring and extending into the upper and lower radial surfaces of said ring and into said axial surface of said sealing ring.

12. A high pressure boundary seal as claimed in claim 11 wherein said substantially rectangular notches are regularly spaced around said upper and lower edges of said sealing ring.

13. A high pressure boundary seal as claimed in claim 1 wherein said sealing ring is directly supported from a rotor, which in turn is supported for rotation by outer races of said upper and lower bearings.

14. A high pressure boundary seal in combination with a spindle motor comprising a shaft and a rotor rotating around the shaft and supporting a hub for supporting one or more discs for rotation around said shaft, bearing means comprising upper and lower bearings for supporting said rotor for rotation around said shaft, and high pressure boundary sealing means for establishing an air pressure boundary region in a gap between surfaces adjacent a surface of said shaft and an extension of said rotor surrounding said shaft to prevent particles or aerosols within said motor from escaping past said seal.

15. A high pressure boundary seal as claimed in claim 14 wherein said sealing means comprise means for creating said air pressure boundary by establishing air flow in offsetting axial directions to establish a tight, narrowly defined sealing boundary adjacent said shaft.

* * * * *